(12) United States Patent
Lefurgy et al.

(10) Patent No.: US 10,048,734 B2
(45) Date of Patent: *Aug. 14, 2018

(54) ADAPTIVE POWER CAPPING IN A CHIP

(71) Applicant: International Business Machines Corporation, Armonk, NY (US)

(72) Inventors: Charles R. Lefurgy, Austin, TX (US); Preetham M. Lobo, Bangalore (IN); Richard F. Rizzolo, Red Hook, NY (US); Malcolm S. Allen-Ware, Austin, TX (US); Tobias Webel, Schaebisch-Gmuend (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/831,576

(22) Filed: Dec. 5, 2017

(65) Prior Publication Data

US 2018/0081413 A1 Mar. 22, 2018

Related U.S. Application Data

(63) Continuation of application No. 14/986,944, filed on Jan. 4, 2016, now Pat. No. 9,874,917.

(51) Int. Cl.
*G06F 1/32* (2006.01)
*G06F 1/28* (2006.01)
*G06F 9/44* (2018.01)

(52) U.S. Cl.
CPC ............. *G06F 1/28* (2013.01); *G06F 1/324* (2013.01); *G06F 1/3243* (2013.01); *G06F 1/3296* (2013.01); *G06F 9/44* (2013.01); *G06F 1/32* (2013.01)

(58) Field of Classification Search
CPC ............. G06F 1/32; G06F 1/26; G06F 1/28
USPC ....... 713/300, 310, 320, 321, 322, 323, 324, 713/330, 375
See application file for complete search history.

(56) References Cited

U.S. PATENT DOCUMENTS

| 7,337,339 B1 * | 2/2008 | Choquette ............. G06F 1/3203 713/300 |
|---|---|---|
| 2005/0071092 A1 | 3/2005 | Farkas et al. |
| 2014/0095912 A1 | 4/2014 | Hurd et al. |

* cited by examiner

*Primary Examiner* — Jaweed A Abbaszadeh
*Assistant Examiner* — Keshab Pandey
(74) *Attorney, Agent, or Firm* — Cantor Colburn LLP

(57) ABSTRACT

Adaptive power capping in a chip that includes a plurality of cores in a processing system is provided. An active power demand for the chip is dynamically determined based on observed events of the cores. An average temperature of the chip is computed using one or more on-chip thermal sensors in the cores to estimate leakage power of the chip. A power capping threshold that incorporates the estimate of leakage power is determined based on the average temperature of the chip. Power capping is performed by throttling the cores based on determining that the active power demand for the chip exceeds the power capping threshold.

1 Claim, 7 Drawing Sheets

ADAPTIVE POWER CAPPING IN A CHIP

PRIORITY

This application is a continuation of and claims priority from U.S. patent application Ser. No. 14/986,944 filed on Jan. 4, 2016, the entire contents of which are incorporated herein by reference.

BACKGROUND

The present application relates generally to computer system performance adaption. More specifically, the present application is directed to adaptive power capping in a chip of a processing system.

High performance and high reliability computer systems typically require redundancy. However, redundant power system components are expensive, and there is a trade-off between initial system cost and operation under loss of redundancy. When redundancy is lost for power supply components, power (or electric current) must be limited to protect against exceeding component specifications to avoid adverse results. In some systems, a loss of redundancy in power distribution can cause a sudden power-down or chip failure if the current demand exceeds power component limits. Reducing system performance by lowering clock frequency and voltage is one option to avoid exceeding component specifications by assuming worst case conditions; however, system performance may be reduced for a substantial period of time until system maintenance/repair is performed.

SUMMARY

A method is provided for adaptive power capping in a chip that includes a plurality of cores in a processing system. An active power demand for the chip is dynamically determined based on observed events of the cores. An average temperature of the chip is computed using one or more on-chip thermal sensors in the cores to estimate leakage power of the chip. A power capping threshold that incorporates the estimate of leakage power is determined based on the average temperature of the chip. Power capping is performed by throttling the cores based on determining that the active power demand for the chip exceeds the power capping threshold.

Embodiments also include a processing system that includes a redundant power system and a processor chip that includes a plurality of cores. The processor chip is operable to dynamically determine an active power demand for the processor chip based on observed events of the cores. An average temperature of the processor chip is computed using one or more on-chip thermal sensors in the cores to estimate leakage power of the processor chip. A power capping threshold that incorporates the estimate of leakage power is determined based on the average temperature of the processor chip. Power capping is performed by throttling the cores based on detecting a redundancy state of the redundant power system and determining that the active power demand for the processor chip exceeds the power capping threshold.

Embodiments also include a computer program product. The computer program product includes a computer readable storage medium having computer readable program code embodied therewith. The program instructions are executable by a processor chip to cause the processor chip to dynamically determine an active power demand for the processor chip based on observed events of the cores. An average temperature of the processor chip is computed using one or more on-chip thermal sensors in the cores to estimate leakage power of the processor chip. A power capping threshold that incorporates the estimate of leakage power is determined based on the average temperature of the processor chip. Power capping is performed by throttling the cores based on determining that the active power demand for the processor chip exceeds the power capping threshold.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments perform adaptive power capping and power throttling in a chip. Embodiments can approximate active power demand dynamically using processor core events that define core activity. On-chip thermal sensors in processor cores can be used to calculate an average temperature of the chip to estimate leakage power. Embodiments include an on-chip microcontroller to compute a total chip-power proxy. A lookup table may be used to determine the chip power capping threshold for the current chip-average temperature and throttle/un-throttle the chip (i.e., reduce/resume activity in all cores simultaneously) if the chip-power proxy exceeds or is below the power capping threshold. Alternate embodiments use the on-chip microcontroller to determine the chip power capping threshold for the current chip-average temperature and write the threshold value to a chip-level hardware register. On-chip logic circuits can compute a total active power demand for all of the cores, compare the total active power demand with the threshold in the chip-level hardware register, and throttle/un-throttle processing on the cores.

Figure 2:
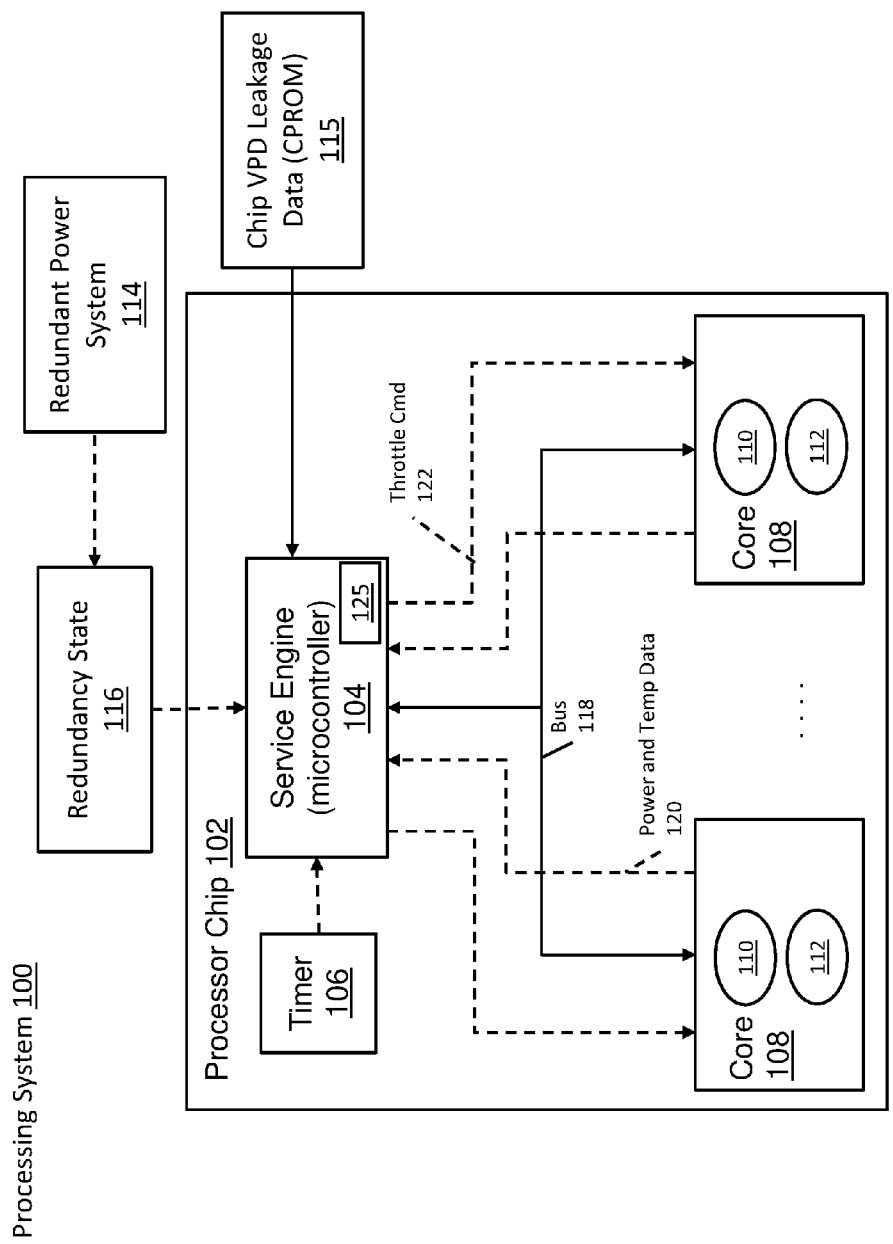
FIG. 2 is an exemplary diagram of a processing system in accordance with an embodiment.
Figure 4:
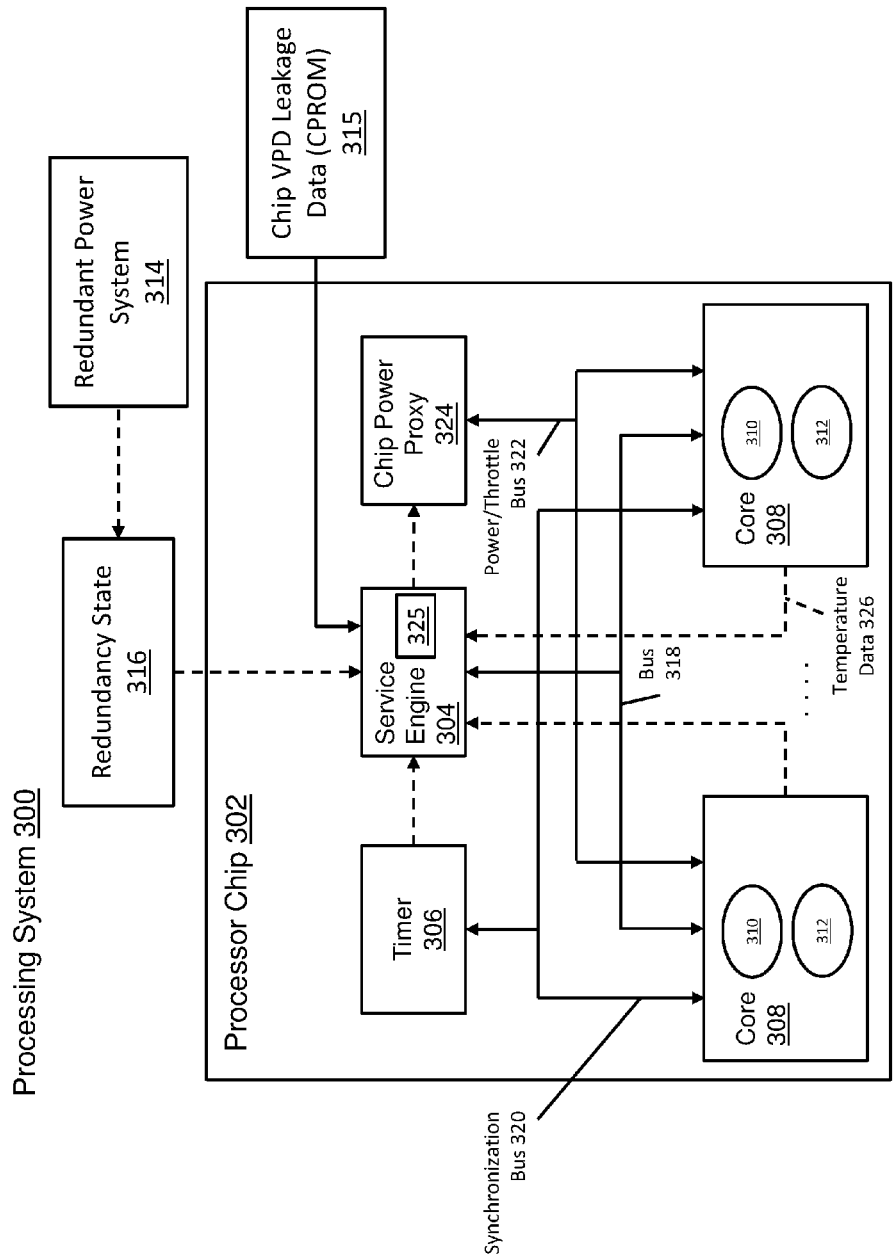
FIG. 4 is an exemplary diagram of a processing system in accordance with an embodiment.

The exemplary embodiments may be implemented for a variety of processors of various computing devices. For example, exemplary embodiments may be used for any of a server computing device, client computing device, communication device, portable computing device, or the like. FIGS. 2 and 4 are provided hereafter as examples of a processing system in which exemplary aspects of the illustrative embodiments may be implemented. FIGS. 2 and 4 are only exemplary and are not intended to state or imply any limitation with regard to the types of computing devices in which the illustrative embodiments may be implemented.

Figure 1:
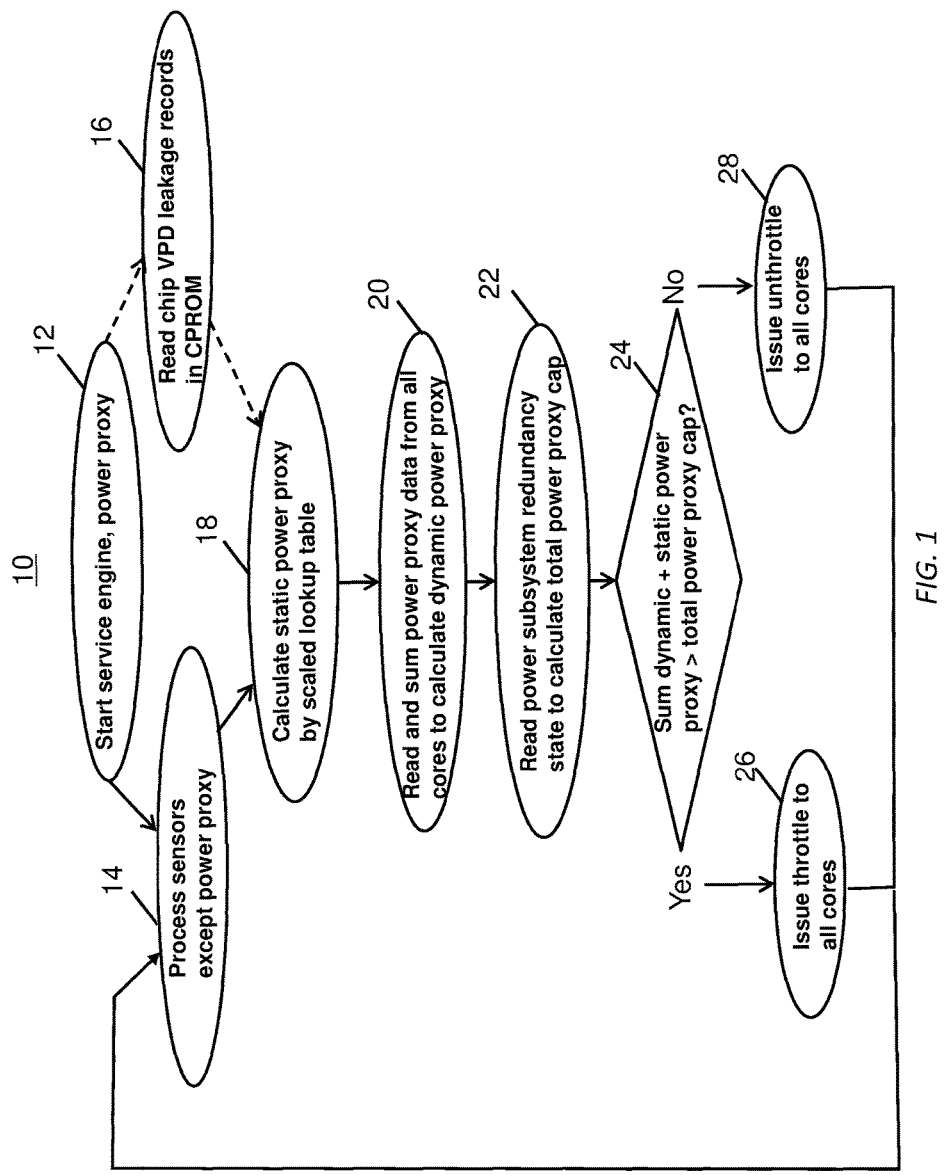
FIG. 1 is an overview flow diagram in accordance with an embodiment.

FIG. 1 depicts an overview process flow 10 according to embodiments. At block 12, a service engine that is an embedded microcontroller on a chip performs many functions, one of which is reading and communicating sensor data. Chip sensors can include temperature, power proxy, and voltage data. At block 14, sensor data is collected, except for the power proxy. The service engine can also read a chip product data memory device (CPROM) at block 16 to collect chip leakage data from chip vital product data (VPD) leakage records. At block 18, temperature data from the sensors and optionally the leakage data from the CPROM can be used to estimate static power via a lookup table. At block 20, the power proxy data is collected and summed to estimate dynamic power from all cores of the chip. A power subsystem redundancy state is read at block 22. Depending whether zero or more power elements fail, the total power limit changes. At block 24, a total power estimate from the static and dynamic power proxies is compared with the power limit based on a redundancy state. If the estimated total power is above the limit, a throttle command is sent to all cores of the chip at block 26, which lowers the power by interrupting the instruction execution flow, for instance, by the insertion of idle or "no-op" cycles. If the total power drops below the limit, throttling is removed at block 28. The process flow 10 then returns to block 14 to perform as a continuous monitor.

Turning now to FIG. 2, a processing system 100 is generally shown that includes a processor chip 102 (also referred to as chip 102) that includes a service engine 104 implemented in an on-chip microcontroller. A timer 106 can be used to establish synchronization and control timing of sensor data acquisition and control operations. The processor chip 102 also includes a plurality of cores 108. The cores 108 can include circuitry such as functional units to fetch, decode, execute, and complete instruction streams. The cores 108 of FIG. 2 also each include a hardware power-proxy circuit 110 and at least one on-chip thermal sensor 112. Other sensors and logic circuits (not depicted) can also be included in the cores 108.

The processing system 100 includes a redundant power system 114 that includes one or more redundant power sub-systems. For example, the redundant power system 114 can include redundancy for point-of-load power components and/or for distributed converter assembly components. The redundant power system 114 may supply alternating current (AC) and/or direct current (DC) power to components of the processing system 100. A redundancy state 116 of the redundant power system 114 may be detected by the service engine 104 or a redundancy state 116 can be sent to the service engine 104 by a system health monitor (not depicted). The redundancy state of the power system may have multiple levels depending on what power components failed. Loss of one or two point of load elements will indicate different redundancy states, as will loss of a distributed converter assembly. In general, there will be different power capping limits depending on the redundancy state.

The service engine can also communicate to the CPROM 115 containing the VPD which contains the chip leakage current or power at known conditions. This can be used to calculate the chip leakage power as described later. The service engine 104 can communicate with the cores 108 via bus 118. The cores 108 can send power and temperature data 120 to the service engine 104 via bus 118. The service engine 104 can send throttle commands 122 (including un-throttle commands) to the cores 108 on bus 118. In an embodiment, the service engine 104 collects the power-proxy and thermal sensor values from the power-proxy circuit 110 and on-chip thermal sensor 112 from every core 108 periodically as power and temperature data 120 using the timer 106.

The service engine 104 can compute a chip-level power-proxy sum (i.e., a total active power demand), an average temperature of the chip 102, and a power capping threshold for the average temperature using a lookup table 125. The service engine 104 can compare the power-proxy sum to the power capping threshold. If the threshold is exceeded, throttling can be issued to all cores 108. Throttling may include insertion of idle cycles to reduce power consumption. If the threshold is not exceeded, throttling can be removed from all cores 108.

In an embodiment, each power-proxy circuit 110 is configured to sample and store values at a regular interval (e.g., every 3.2 milliseconds). The service engine 104 can read all the sensors (e.g., on-chip thermal sensors 112) on chip 102 periodically in a loop (e.g., every 16 milliseconds). If the power-proxy circuits 110 are sampled more frequently than the on-chip thermal sensors 112, the power-proxy circuits 110 can be read multiple times per loop. The service engine 104 may be configured to read all sensors (e.g., on-chip thermal sensors 112) at the start of a loop, and after that read the power-proxy circuits 110 multiple times within a loop. To ensure that the power-proxy sample is stable, when the service engine 104 is reading the value, a time offset can be added.

Figure 3:
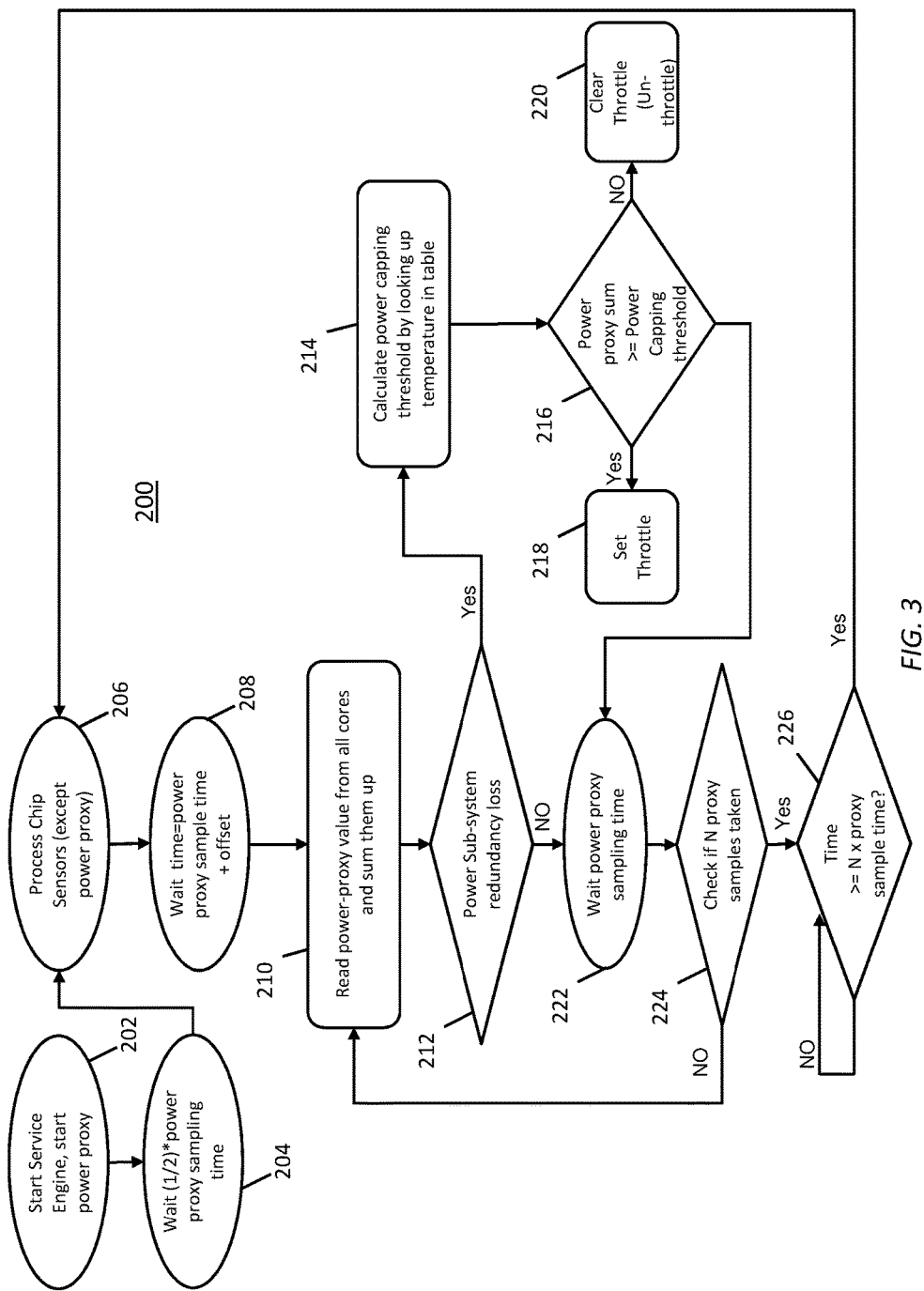
FIG. 3 illustrates a flow diagram of a process for adaptive power capping in accordance with an exemplary embodiment.

FIG. 3 illustrates a flow diagram of a process 200 for adaptive power capping in accordance with an exemplary embodiment and is described with respect to FIG. 2. At block 202, the service engine 104 and the power-proxy circuit 110 of each core 108 are started. At block 204, the service engine 104 waits for half of the power proxy sampling time. At block 206, sensors, such as on-chip thermal sensors 112, of chip 102 are processed except for the power-proxy circuits 110. At block 208, a wait can be performed for the power proxy sample time plus an offset to ensure stable sample values. At block 210, power proxy values can be read from the power-proxy circuit 110 of each core 108 and summed as a total active power demand. At block 212, a check for a redundancy state 116 is performed. If there is a redundancy state 116 indicating redundancy loss, then at block 214 a power capping threshold is determined by looking up the average temperature in the lookup table 125. At block 216, the power-proxy sum (total active power demand) is compared to the power capping threshold. The service engine 104 may send throttle commands 122 to the cores 108 at block 218 based on determining that the power-proxy sum (i.e., total active power demand) is greater than or equal to the power capping threshold. Otherwise, at block 220, throttling is cleared (i.e., un-throttle).

After a throttling determination has been made at block 216 or if the redundancy state 116 detected at block 212 indicates no redundancy loss, then at block 222 waiting is performed for the power proxy sample time. At block 224, a check is performed to determine whether N (e.g., 5) proxy samples have been taken. If not, then the flow returns to block 210. If N proxy samples have been taken, then at block 226, a check is performed to determine whether it is time to return to block 206 and process chip sensors again (e.g., time >=N multiplied by the proxy sample time).

FIG. 4 is an exemplary diagram of a processing system 300 in accordance with an embodiment. Similar to the processing system 100 of FIG. 2, the processing system 300 of FIG. 4 includes a processor chip 302 (also referred to as chip 302) that includes a service engine 304 implemented in an on-chip microcontroller. A timer 306 can be used to establish synchronization and control timing of sensor data acquisition and control operations. The processor chip 302 also includes a plurality of cores 308. The cores 308 can include circuitry such as functional units to fetch, decode, execute, and complete instruction streams. The cores 308 of FIG. 4 also each include a hardware power-proxy circuit 310 and at least one on-chip thermal sensor 312. Other sensors and logic circuits (not depicted) can also be included in the cores 308. Similar to processing system 100 of FIG. 2, a redundancy state 316 of a redundant power system 314 may be detected by the service engine 304 or a redundancy state 316 can be sent to the service engine 304 by a system health monitor (not depicted).

The service engine can also communicate to the CPROM 315 containing the chip vital product data which contains the chip leakage current or power at known conditions. This can be used to calculate the chip leakage power as described later. The service engine 304 can communicate with the cores 308 via bus 318. The cores 308 interface with timer 306 via synchronization bus 320. The cores 308 can also interface with a chip power proxy 324 via power/throttle bus 322. Although the bus 318, synchronization bus 320, and power/throttle bus 322 are depicted as separate buses, one or more of the buses 318-322 can be combined or further partitioned in embodiments. Various commands and data can be transmitted over the buses 318-322. For example, bus 318 may be used by the service engine 304 to read temperature data 326 from on-chip thermal sensors 312 of cores 308. The power/throttle bus 322 can be used to send power proxy data from power-proxy circuits 310 of cores 308 to chip power proxy 324 and for chip power proxy 324 to send throttle/un-throttle commands to cores 308. In the example of FIG. 4, the chip power proxy 324 is implemented in hardware for faster response time and to reduce processing burdens on the service engine 304.

Figure 5:
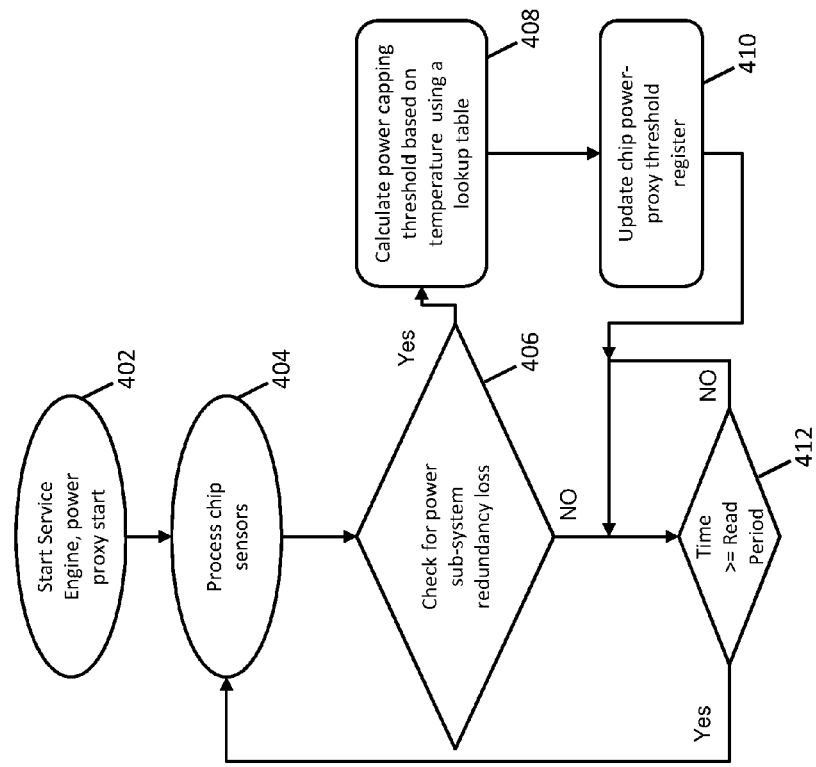
FIG. 5 illustrates a flow diagram of a method for setting a power capping threshold in accordance with an exemplary embodiment.

FIG. 5 illustrates a flow diagram of a method 400 for setting a power capping threshold in accordance with an exemplary embodiment and is describe with reference to FIG. 4. In method 400, at block 402, the service engine 304 and the power-proxy circuit 310 of each core 308 are started. At block 404, sensors, such as on-chip thermal sensors 312, of chip 302 are processed except for the power-proxy circuits 310. At block 406, a redundancy state check 316 is performed. If the redundancy state 316 indicates a loss of redundancy then at block 408 a power capping threshold is determined by looking up the average temperature in the lookup table 325. At block 410, the power capping threshold is written to a chip-level register (e.g., a chip power-proxy threshold register) of the chip power proxy 324. There may exist a different power cap limit for each redundancy state. After block 410 or if there was no redundancy state 316 detected at block 406, then at block 412, a check is performed to determine whether it is time to return to block 404 and process chip sensors again (e.g., time >=16 milliseconds).

Figure 6:
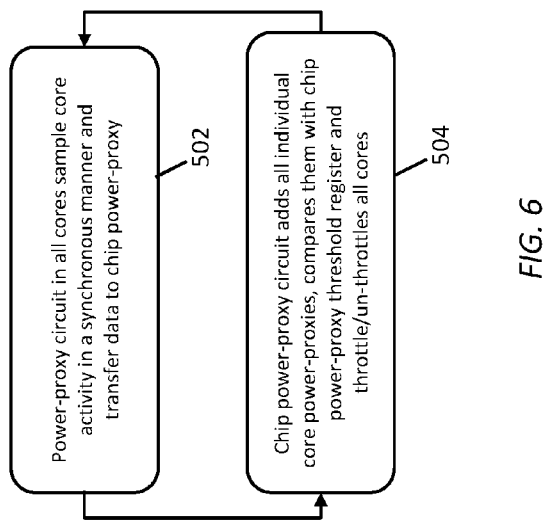
FIG. 6 illustrates a flow diagram of a method for power-proxy circuit operation in accordance with an exemplary embodiment.

The method 400 can be performed by service engine 304 of FIG. 4 while method 500 of FIG. 6 is performed by the chip power proxy 324 of FIG. 4. In method 500, at block 502, the power-proxy circuit 310 in each of the cores 308 sample core activity in a synchronous manner (e.g., using timer 306) and transfer data to the chip power-proxy 324. At block 504, a circuit of the chip power proxy 324 adds all individual core power-proxies, compares them with the chip power-proxy threshold register and throttle/un-throttles processing on all cores 308.

Figure 7:
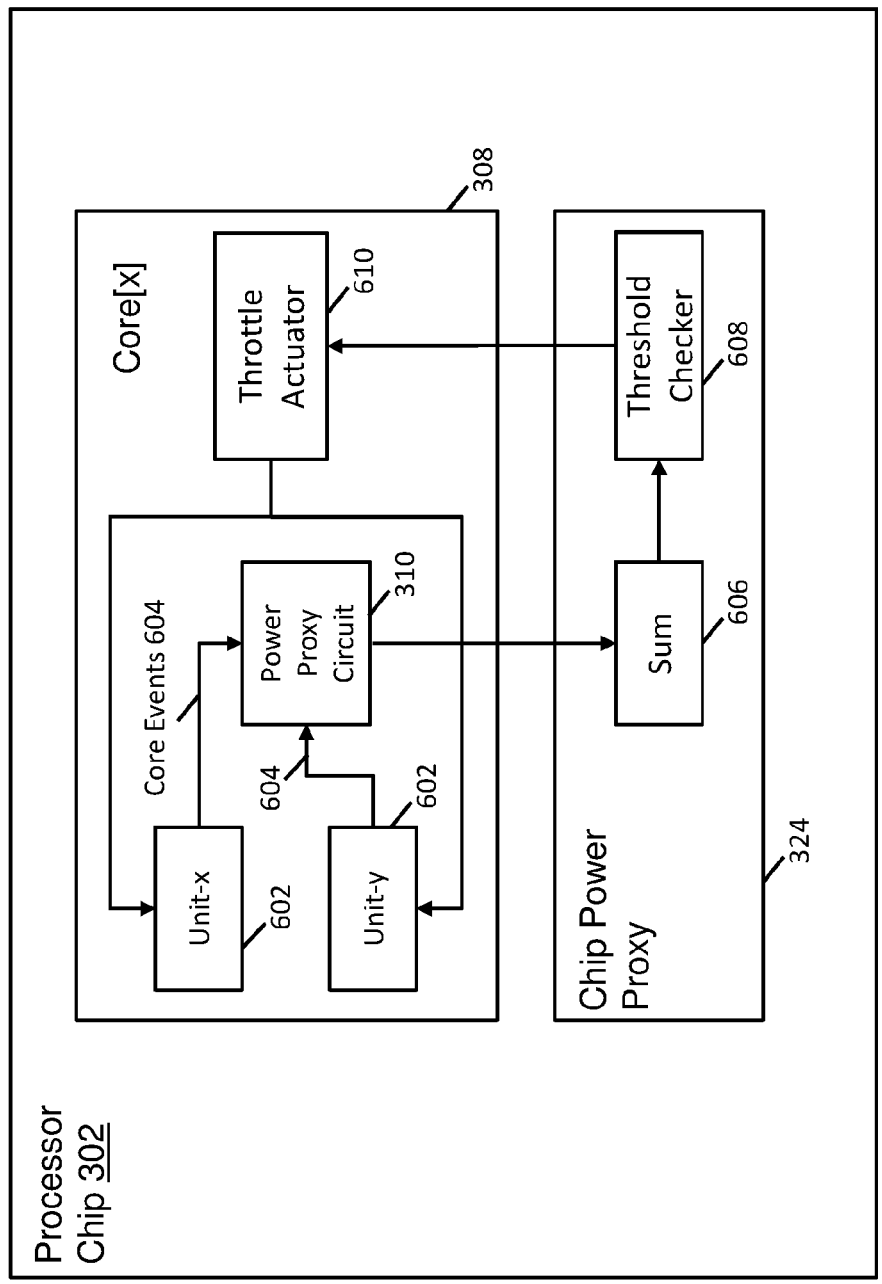
FIG. 7 depicts an exemplary diagram of a portion of a processor chip in accordance with an embodiment.

Interactions between the chip power proxy 324 and cores 308 are further depicted in FIG. 7. Various functional units 602 (e.g., execution units, load/store units, floating-point units, fixed-point units, instruction fetching units, completion units, etc.) of each core 308 can provide core events 604 to a power-proxy circuit 310 which provides localized power proxy data to a summing circuit 606 of the chip power proxy 324 to produce a total active power demand. A threshold checker 608 can compare the total active power demand with a power capping threshold stored in a threshold register of the chip power proxy 324 to determine whether to command a throttle actuator 610 in each core 308 to throttle/un-throttle processing.

Power-proxy estimation in hardware (e.g., by power-proxy circuit 110 of FIG. 2 or power-proxy circuit 310 of FIGS. 4 and 7) can be performed by defining core events that represent activity, such as a number of instructions executed per second and/or activity of particular functional units 602 of the cores 308. Weights for core events 604 can be obtained through a calibration process. A power-proxy value can be estimated as dynamic AC power according to equation 1.

$$\text{Power-proxy value}=A*\text{SUM}(Wi,Ci)+K \quad \text{(Equation 1)}$$

Equation 1 can be a linear fit in the form y=mx+x, where A=m and K=c. W is a weight for a core event "i". C is a count value of core event "i". A is a calibration scaling factor. K is a calibration constant.

A power capping table (e.g., lookup table 125, 325) may be generated by taking leakage current into account. A current-cap value can be selected and the corresponding power can be adjusted for the system load-line at a nominal voltage for the worst-case chip. Leakage current can be computed at an idle state of the chip (i.e., no workload running). Leakage current for temperature can be computed using equation 2.

$$\text{Ivdd\_leak\_corrected}=\text{Ivdd\_leak}*1.25\hat{}((T\_\text{run}-T\_\text{idle})/10) \text{ Amps} \quad \text{(Equation 2)}$$

In equation 2, T_idle is a constant. DC power can be computed using equation 3.

$$\text{Vdd\_power\_DC}\_v1=\text{Ivdd\_leak\_corrected}*\text{Vdd Watts} \quad \text{(Equation 3)}$$

An AC power-cap can be computed using equation 4.

$$\text{power\_set\_point}-\text{Vdd}_{13}\text{ power\_DC}\_v1 \quad \text{(Equation 4)}$$

The AC power-cap can be converted to a corresponding power-proxy value as described by equation 1. Equations 2-4 can be computed for a wide range of temperatures to generate a power capping table stored in memory of the service engine 104, 304. Another approach is to use the chip VPD record containing the leakage power and current at known voltage and temperature. This data is collected at chip test conditions along with other chip VPD data including intrinsic chip speed (as given by on chip ring oscillators for example), or chip nominal voltage. The estimated leakage or DC current can be calculated at any voltage V1 and temperature T1 from the leakage current Ivdd_leak0 in the VPD record that was determined at voltage V0 and temperature T0 from the following equation. Vdoub is the doubling voltage (the change in voltage in Volts that doubles the leakage current) and is 0.15V in the present embodiment. Tdoub is the analogous doubling temperature in degrees Celsius and is 30 C in the present embodiment. This equation is specific to this implementation but is generally semiconductor technology dependent and can be determined for each technology by one skilled in the art.

$$Ivdd\_leak1(V1,T1)=Ivdd\_leak0(V0,T0)*2^{((V1-V0)/Vdoub)}*2^{((T1-T0)/Tdoub)}$$

$$Leakage\ power\ Vdd\_power\_DC\_v1=Ivdd\_leak(V1,T1)*V1$$

Figure 8:
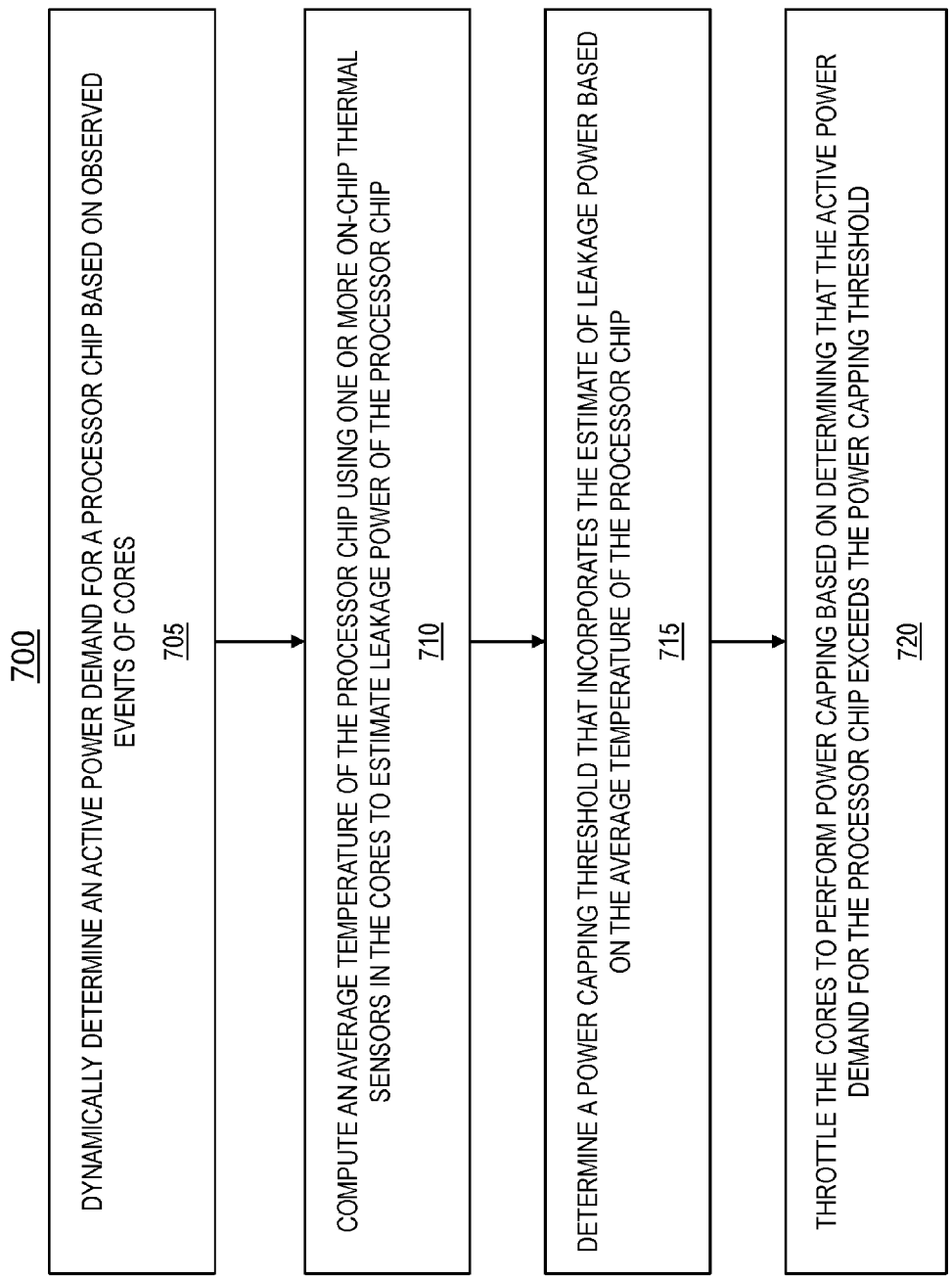
FIG. 8 illustrates a flow diagram of a process for adaptive power capping in accordance with exemplary embodiments.

V1 and T1 are in Volts and degrees Celsius respectively and may be determined from sensor readings. FIG. 8 illustrates a flow diagram of a method 700 for adaptive power capping in accordance with an exemplary embodiment. FIG. 8 is described in reference to FIGS. 1-7 and may be performed in an alternate order and include additional steps beyond those depicted in FIG. 8. In some embodiments, an on-chip micro-controller (e.g., service engine 104, 304) computes a total active power demand and controls the throttling of the cores. In alternate embodiments, an on-chip micro-controller (e.g., service engine 104, 304) determines the power capping threshold and writes the power capping threshold to a chip-level register, and the on-chip logic circuits compute a total active power demand from the cores 108, 308 and control the throttling of the cores 108, 308.

At block 705, an active power demand for a processor chip 102, 302 is dynamically determined based on observed events of the cores 108, 308. Active power demand may be computed by service engine 104 or chip power proxy 324 in embodiments.

At block 710, an average temperature of the processor chip 102, 302 is computed by service engine 104, 304 using one or more on-chip thermal sensors 112, 312 in the cores 108, 308 to estimate leakage power of the processor chip 102, 302. The active power demand can be determined at a higher frequency than the average temperature is computed.

At block 715, a power capping threshold that incorporates the estimate of leakage power is determined by service engine 104, 304 based on the average temperature of the processor chip 102, 302. The power capping threshold can be determined using the average temperature of the processor chip 102, 302 to index into a power capping table (e.g., lookup table 125, 325) comprising a plurality of power capping thresholds that are predetermined based on a leakage power model of a reference chip.

At block 720, the cores 108, 308 are throttled to perform power capping based on determining that the active power demand for the processor chip 102, 302 exceeds the power capping threshold. The throttling of the cores 108, 308 can be based on detecting a redundancy state 116, 316 of a redundant power system 114, 314 of the processing system 100, 300. Throttling the cores 108, 308 can be performed by selectively inserting idle cycles at each of the cores 108, 308 to decrease processing throughput by lowering usage of functional units 602 of the cores 108, 308. The cores 108, 308 can also be un-throttled to remove the throttling based determining that the active power demand for the processor chip 102, 302 does not exceed the power capping threshold. Un-throttling can stop inserting additional idle cycles to increase processing throughput, for example.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of adaptive power capping in a chip comprising a plurality of cores in a processing system, the method comprising:

dynamically determining an active power demand for the chip based on observed events of the cores;

computing an average temperature of the chip using one or more on-chip thermal sensors in the cores to estimate leakage power of the chip, wherein the active power demand for the chip is determined at a higher frequency than the average temperature of the chip is computed;

detecting a redundancy loss of a redundant power system of the processing system based on a redundancy state indicating a failure of one or more point-of-load power components or a failure of one or more distributed converter assembly components of the redundant power system;

determining a power capping threshold that incorporates the estimate of leakage power by using the average temperature of the chip to index into a power capping table and retrieve the power capping threshold responsive to detecting the redundancy loss of the redundant power system, the power capping table comprising a plurality of power capping thresholds that are predetermined based on a leakage power model of a reference chip;

throttling the cores to perform power capping by selectively inserting idle cycles at each of the cores based on detecting the redundancy loss of the redundant power system and determining that the active power demand for the chip exceeds the power capping threshold; and un-throttling the cores to remove the throttling by stopping insertion of the idle cycles based determining that the active power demand for the chip does not exceed the power capping threshold.

* * * * *